United States Patent
Ayres (10) Patent No.: US 6,854,350 B2
(45) Date of Patent: Feb. 15, 2005

(54) CALIBRATED CUSTOM INSTRUMENT GAUGE MODULE AND MEANS FOR ASSEMBLY

(76) Inventor: Craig A. Ayres, 223 Briarwood Dr., Lapeer, MI (US) 48446

( * ) Notice: Subject to any disclaimer, the term of this patent is extended or adjusted under 35 U.S.C. 154(b) by 0 days.

(21) Appl. No.: 10/408,143

(22) Filed: Apr. 4, 2003

(65) Prior Publication Data

US 2003/0230154 A1 Dec. 18, 2003

Related U.S. Application Data

(60) Provisional application No. 60/369,903, filed on Apr. 4, 2002.

(51) Int. Cl.[7] .................. G01D 21/00; G01D 11/28; B60Q 1/00; B60Q 1/26
(52) U.S. Cl. .................. 73/866.3; 362/29; 362/489
(58) Field of Search ............... 73/866.3, 1.01, 73/1.37, 431; 345/23; 362/489, 29; 296/70; 361/659; 324/156

(56) References Cited

U.S. PATENT DOCUMENTS

| | | | | |
|---|---|---|---|---|
| 5,018,087 A | * | 5/1991 | Dannenberg | 702/96 |
| 5,672,823 A | * | 9/1997 | Lachmann et al. | 73/431 |
| 6,179,429 B1 | * | 1/2001 | Sheldon et al. | 362/26 |

* cited by examiner

Primary Examiner—Hezron Williams
Assistant Examiner—Tamiko Bellamy
(74) Attorney, Agent, or Firm—Fildes & Outland, P.C.

(57) ABSTRACT

A custom instrument gauge module is disclosed which replaces the OEM instrument cluster gauges sub-assembly and utilizes the original electronic circuitry for the unique customization of an existing instrument cluster. The custom gauge module is designed and calibrated to replace the original cluster graphics, gauges, and pointers, while maintaining the original cluster circuitry and, optionally, the molded housing. The flexible design and manufacturing of the custom gauge module allows the enhancement of existing instrument panels to have an upgraded appearance and additional functions, while maintaining and using the original cluster complex electronic circuit.

32 Claims, 8 Drawing Sheets

Mechanical Fastners

Orignal Cluster
Electronic Circuit

Orignal Cluster
Electronic Circuit

Box Clips

FIG - 10

Thin Formable Sheet Metal

Rings Applied to the Bezel

Custom Module with Trim

Customized Orignal Cluster with a Compass Function Added

FIG - 12

CALIBRATED CUSTOM INSTRUMENT GAUGE MODULE AND MEANS FOR ASSEMBLY

CROSS REFERENCE TO RELATED APPLICATION

This application claims the priority of U.S. provisional patent application No. 60/369,903 filed Apr. 4, 2002.

TECHNICAL FIELD

This invention relates to the customization of original equipment manufactured (OEM) gauge-based instrument clusters that are integrated into or intended for integration into automotive, marine, and other motor vehicles.

BACKGROUND OF THE INVENTION

Motor vehicles are generally equipped with a variety of instruments for providing information on the status of the vehicle. These instruments often include a speedometer for indicating the speed of the vehicle, a tachometer for showing the speed of the engine, and various other gauges for showing engine temperature and fluid levels, for example. Similar instrumentation is present on aircraft, boats, motorcycles and other vehicles.

These instruments often include analog gauges wherein a needle or pointer is mounted on the rotary output shaft of a gauge motor and assumes different positions based on the control signal received by the gauge. These instruments have many unique designs and styles, including the appearance of graphics, gauge layout, backlighting, and trim. However, though these instruments are uniquely designed for each brand vehicle, they are manufactured in a high volume capacity and from an individual view, they loose their uniqueness. For individuals and for limited production vehicle manufacturers, there has been a need to "personalize" or customize the original instruments in their vehicles.

One attempt to create customization of the original instruments has been by means of a thin graphic overlay, which in some cases includes nighttime backlighting. This custom graphic overlay is purchased and installed by an individual. The individual has to first remove the instrument cluster from the vehicle. Once the instrument cluster is removed, the instrument cluster bezel or mask has to be removed.

The addition of the graphic overlay is usually achieved by an adhesive means. This attachment of the graphic overlay usually involves the gauge pointers and the original graphic overlay, which have to be removed first. Once the pointers are removed, the original graphic overlay then can be removed. The custom graphic overlay can then be pressed directly to the OEM lightpipe or gauge assembly.

After the custom graphic overlay is attached, the instrument cluster must be re-calibrated. Often the instrument cluster is very difficult to re-calibrate or is not re-calibrated properly. In some cases, tools are supplied with the custom graphic overlay to assist in the sensitive task of pointer re-calibration. Overall, the task of re-calibration by individuals and even in limited vehicle production plants is not preferred and may cause damage to the instrument cluster.

Another attempt to create customization of the original instruments has been by means of supplying new instruments all together. This involves replacing the entire original instrument cluster or adding to the original cluster a new set of gauges or instruments along with attaching additional electrical interfaces to the vehicle. For example, an original analog instrument cluster can be replaced with a complete digital instrument cluster or display. This, however, is quite costly and is usually applied to "hot rods" where multiple individual gauges are updated with a single digital instrument display or additional gauge information.

Figure 1:
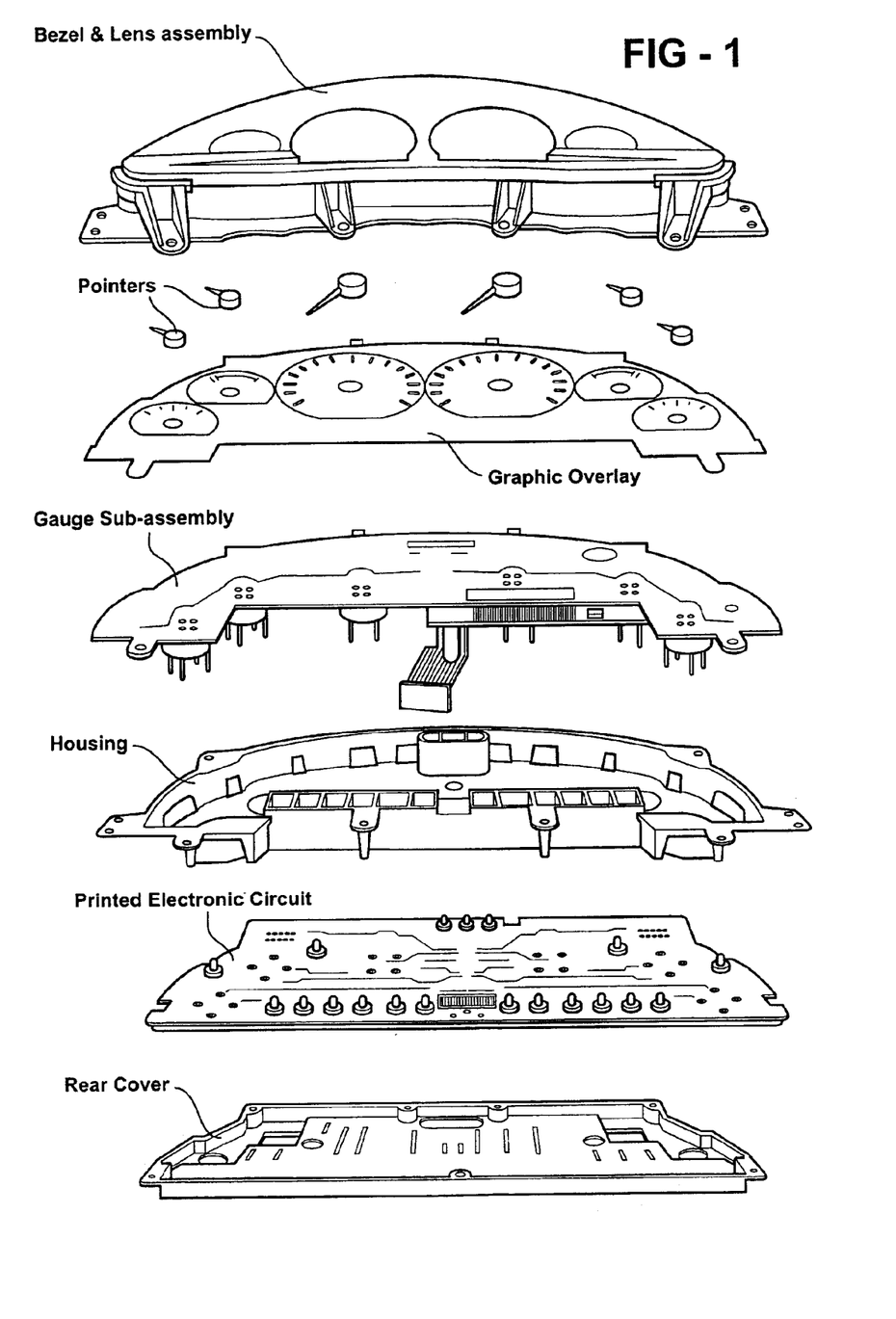
FIG. 1 is an exploded pictorial view of a typical OEM instrument cluster for a vehicle.

An exploded view of a typical OEM instrument cluster assembly, shown in FIG. 1 is included to provide a better understanding of the present invention. The cluster assembly includes a bezel and lens sub-assembly attached to a molded housing and enclosing a gauge sub-assembly. A printed electronics circuit (electronic circuitry) is attached to the rear of the housing and is protected by a rear cover.

The bezel and lens sub-assembly provides protection and possible decoration to the gauge sub-assembly as well as means for mounting in the vehicle. The gauge sub-assembly includes multiple analog gauges and display attached to a molded gauge support which may be a lightpipe. A graphic overlay is attached to the face of the gauge sub-assembly with pointers on the gauge shafts. The molded housing contains the gauge sub-assembly and provides for additional mounting support to the vehicle. The printed electronic circuit provides signals to the gauge sub-assembly and interfaces with the vehicle electrical system.

SUMMARY OF THE INVENTION

The present invention addresses the problems associated with the difficult task of customizing an original instrument cluster along with the high costs of a complete new instrument. The present invention comprises a calibrated custom instrument gauge module that can be inserted into or interfaced with an existing original instrument cluster circuitry to create a personalized or custom appearance. For simplicity, the invention will be described in terms of an instrument module for use in an automobile; however, it could just as easily be used in a truck, motorcycle, boat, airplane, or any other vehicle that includes original instrumentation.

The calibrated custom instrument gauge module replaces the OEM gauge sub-assembly including graphics, pointers, and lightpipe if present, along with optional trim, in the original instrument cluster. This allows one to obtain a new visual appearance including graphics, backlighting, pointers, and trim, while utilizing the complex circuitry of the original instrument cluster and, if desired, the original molded housing. Furthermore, this module comes pre-calibrated, eliminating the user from tampering with the gauge level indicators.

This module not only allows customization of original appearance and functions, but further provides for optional enhancements such as alteration of indicator center positions and addition of extra display information (e.g., compass, outside temperature, etc.). Overall, the module can be sold separately and installed into an existing OEM cluster by an individual, thus customizing their instrument cluster, without tampering with gauge indicators and without the cost of a complete new instrument cluster.

In a preferred embodiment, the present invention comprises multiple gauges mounted to custom printed circuits containing electrical contacts developed for the electrical interface to an original cluster electronic circuitry, which is mounted to the bottom side of a flat plastic support member containing pressed metal inserts. A backlighting member along with a graphic member is applied to the top of the plastic member sub-assembly. The backlighting member contains a connection to a power supply that is developed and included with the module to interface to an original cluster circuitry.

The present invention is electrically calibrated with pointers pressed onto the gauge shaft at the proper angular positions. The custom instrument module of the present invention further comprises a decorated bezel and lens attached over the top of the completed assembly. Each module is designed for a unique vehicle make and model to be installed into the existing instrument cluster circuitry and housing.

Figure 2A:
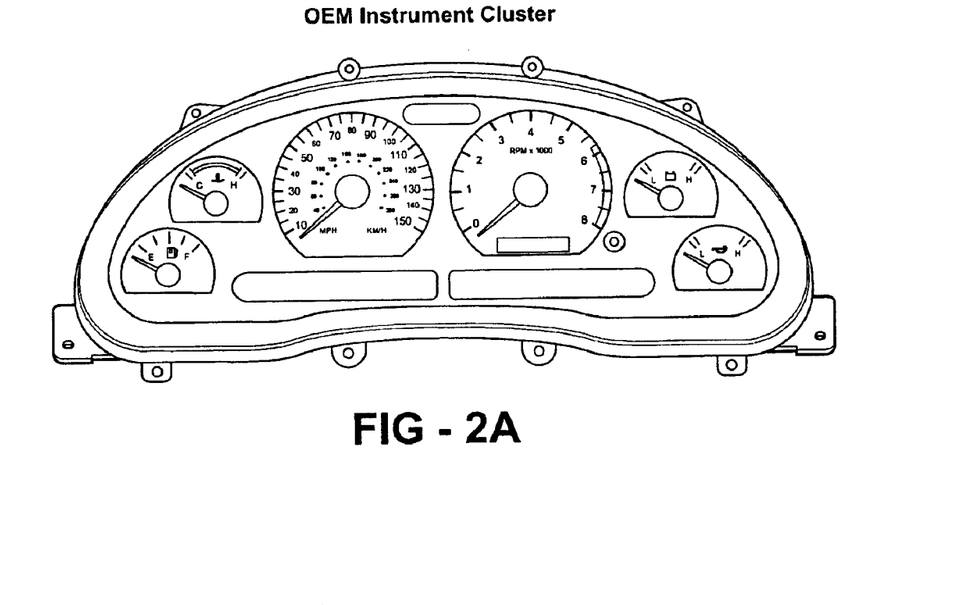
FIG. 2A is a front view of the instrument cluster of FIG. 1.
Figure 2B:
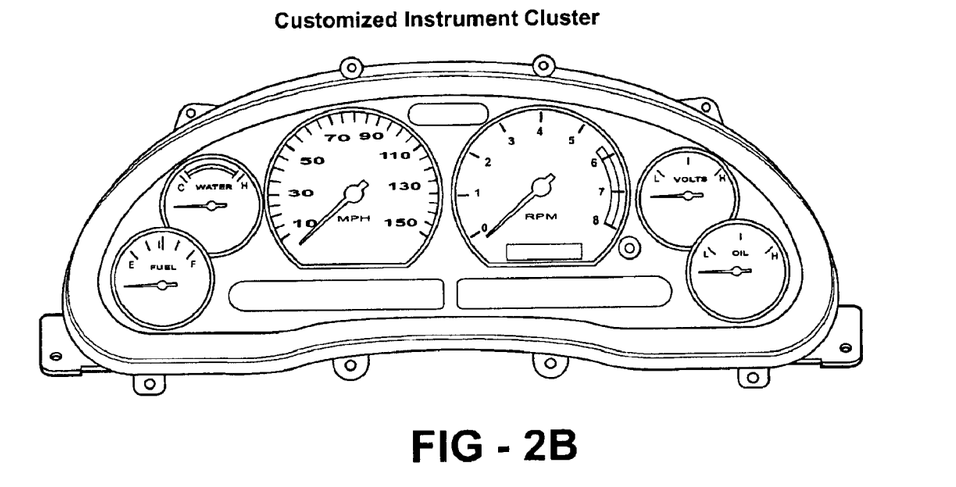
FIG. 2B is a front view of a customized instrument cluster for replacing the cluster of FIG. 2A.

FIGS. 2A and 2B compare the appearance of the original instrument cluster (FIG. 2A) with a customized cluster (FIG. 2B) formed according to the present invention.

An existing OEM instrument cluster is customized with a Calibrated Custom Instrument Gauge Module preferably in the following way. The OEM instrument cluster is removed from a vehicle. The OEM instrument cluster bezel with lens is removed from the original cluster assembly. The OEM gauge sub-assembly is disconnected from the cluster circuitry and is removed from the cluster assembly.

The new Calibrated Custom Instrument Gauge Module is assembled into the OEM instrument cluster housing and directly connected to the OEM electronic circuitry. Additional sub-components may require attachment to the custom Instrument Gauge Module before final installation (for example an odometer display from the OEM cluster). The final customized instrument cluster is fastened together. The customized instrument cluster is installed back into the vehicle.

Overall, the calibrated custom instrument module of the present invention brings about customization of original instrument clusters with enhancements that involve graphic color and style, backlighting color, gauge center locations, unique pointer styles, and custom trim and decoration. This module is a pre-calibrated unit that can utilize an original instrument cluster electronic circuit to form a customized instrument cluster assembly.

It is therefore a principal object of the present invention to provide a calibrated instrument module that replaces an existing OEM instrument cluster sub-assembly and interfaces with the original instrumentation circuitry and housing for the customization of original instrumentation for vehicles. The assembly of the replacement calibrated instrument module with the original instrumentation circuitry forms an operating combination referred to herein as an operational assembly.

It is another object of the present invention to provide a calibrated instrument module that replaces an existing OEM instrument cluster sub-assembly and interfaces with the original instrumentation circuitry in a separate housing or location for the customization of original instrumentation for vehicles.

It a further object of the present invention to provide upgrades and additional functions to the original instrumentation while maintaining the interface with the original instrumentation circuitry.

These and other features and advantages of the invention will be more fully understood from the following detailed description of the invention taken together with the accompanying drawings.

DETAILED DESCRIPTION OF THE INVENTION

Figure 3:
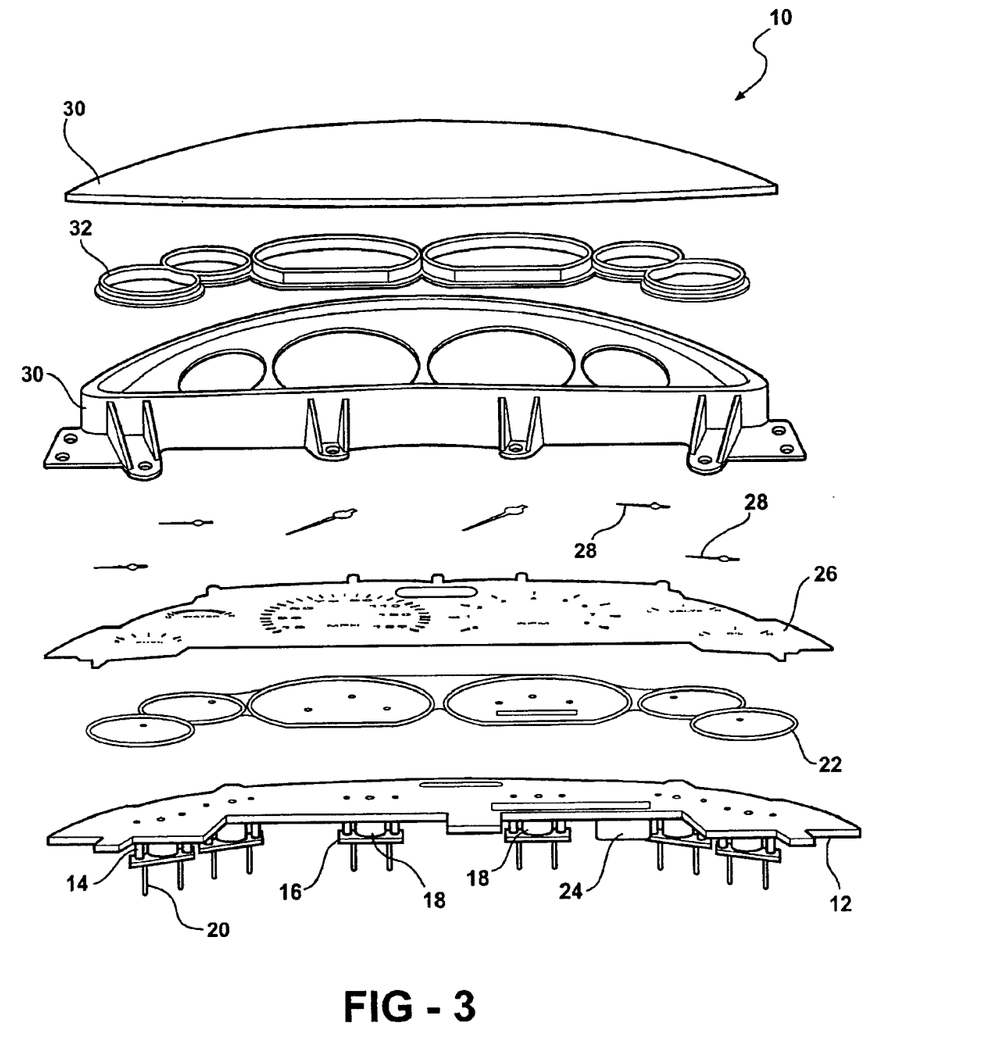
FIG. 3 is an exploded view of a preferred embodiment of a custom instrument module made according to the invention.

Referring now to the drawings in detail, FIG. 3 shows a calibrated custom instrument module 10 comprising a support member 12 having pressed inserts 14 from the bottom side for holding one or more printed circuits 16 that contain one or more analog gauge mechanisms 18 and electrical contacts 20. The topside of the support member 12 has attached a backlighting member 22 that is connected to backlighting control circuitry 24, shown mounted to the backside of the support member 12.

Attached to the top of the backlighting member 22 is a graphic overlay 26 that is designed to meet or exceed the minimum specific driver information required for a given instrument cluster or vehicle. A pointer 28 is applied and attached to each of the analog gauge mechanisms 18 during an electrical calibration stage of production of the module 10. A molded bezel and lens assembly 30, that has been modified with a decoration 32, is attached to the front of the graphic overlay 26 and the support member 12.

Figure 4:
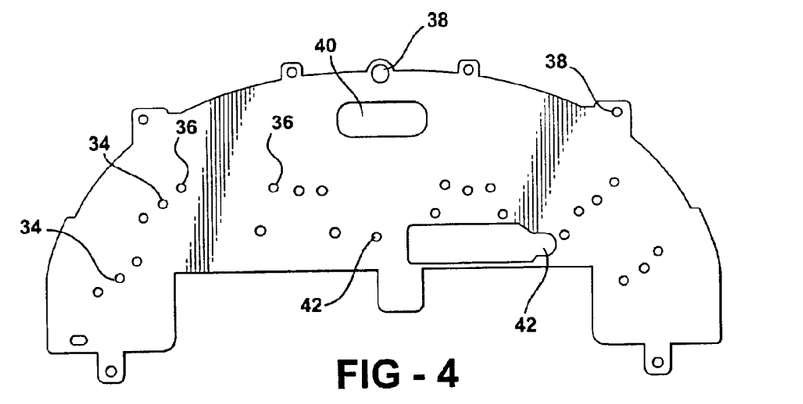
FIG. 4 is a front view of a support member shown in FIG. 3.

The preferred embodiment of the support member 12 is a flat plastic ABS sheet of material that is laser cut based on design of the custom cluster style. FIG. 4 shows a custom design of the support member 12 which includes clearance holes 34 for analog gauge shafts, alignment holes 36 for the pressed inserts 14, attachments 38 required for the original cluster housing if it is to be used, clearance 40 for backlighting of telltales through the graphics, and provisions 42 for additional attachments such as an odometer or PRDNL functions.

Other alternative constructions for the support member 12 include but are not limited to the following: use of metal material that is processed similar to the ABS material, use of a clear sheet of plastic material such as polycarbonate, or use of an injection molding process for higher volume applications.

Figure 5:
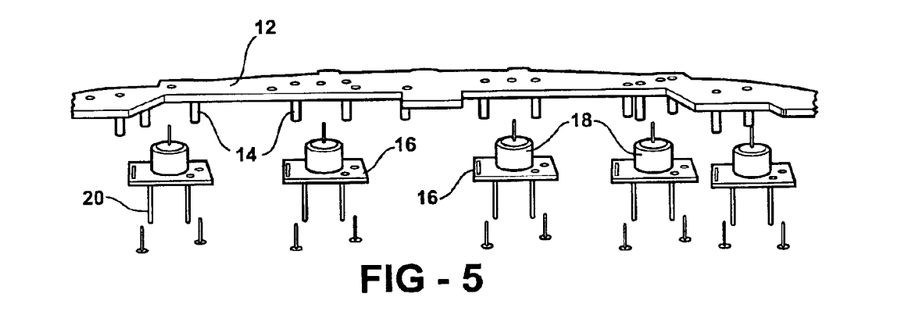
FIG. 5 is an exploded view of a multiple gauge sub-assembly including the support member of FIG. 4.
Figure 6:
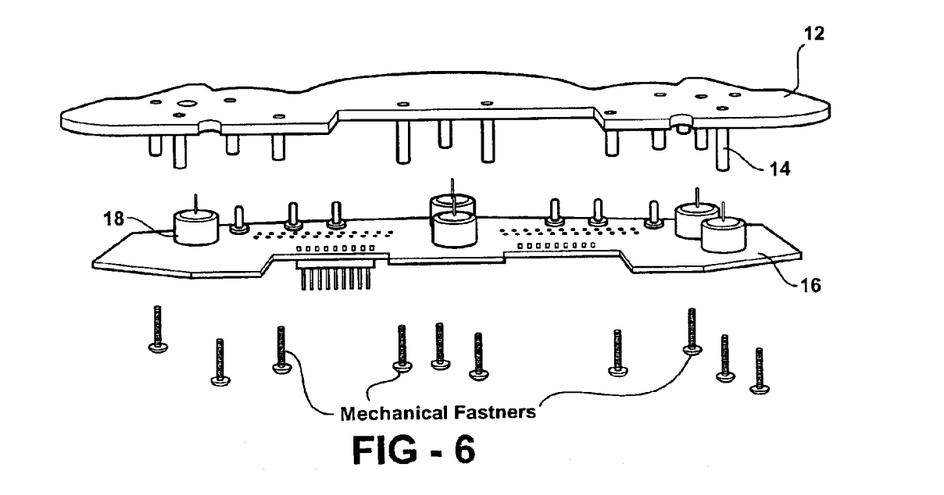
FIG. 6 is an exploded view of an alternative multiple gauge sub-assembly including a support member.

FIG. 5 shows a method for attachment of the gauge mechanisms 18 to the support member 12 is by use of inserts 14 made of brass, which are pressed into the support member 12. The length of the brass inserts 14 can be adjusted to set the proper spacing between the printed circuit 16 that contains a gauge mechanism 18 and electrical contacts 20, which will affect the overall height of the pointers 28.

Figure 11A:
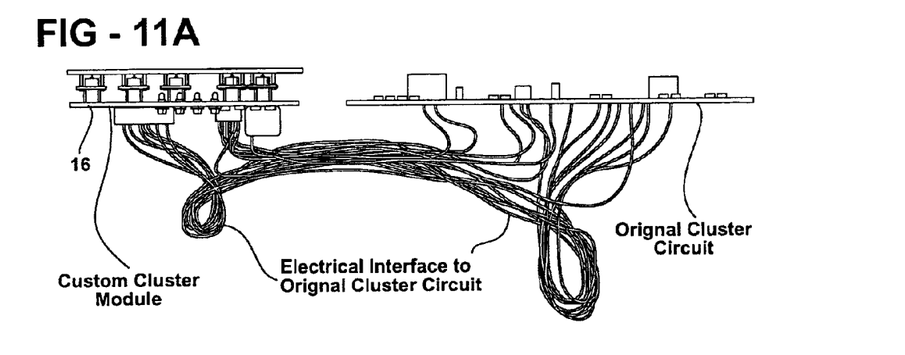
FIG. 11A is a front perspective view of an alternative embodiment of the invention wherein the custom cluster module is mounted in a housing and location differing from the original instrument cluster.

The printed circuits 16 are mechanically screwed to the pressed inserts 14. This is also a preferred method for most additional attachments to the support member such as an odometer attachment. With use of an injection molding process, the support member 12 could make use of attachment bosses that would eliminate use of pressed inserts. This preferred method of attachment is also shown in FIG. 11A for attaching a continuous custom printed circuit 16 with attached multiple gauge mechanisms 18 and secured to the support member 12 by means of brass inserts 14 and mechanical screws.

If desired, gauges containing electrical contacts may be used in place of gages mounted on one or more circuit boards with attached contacts.

Figure 7A:
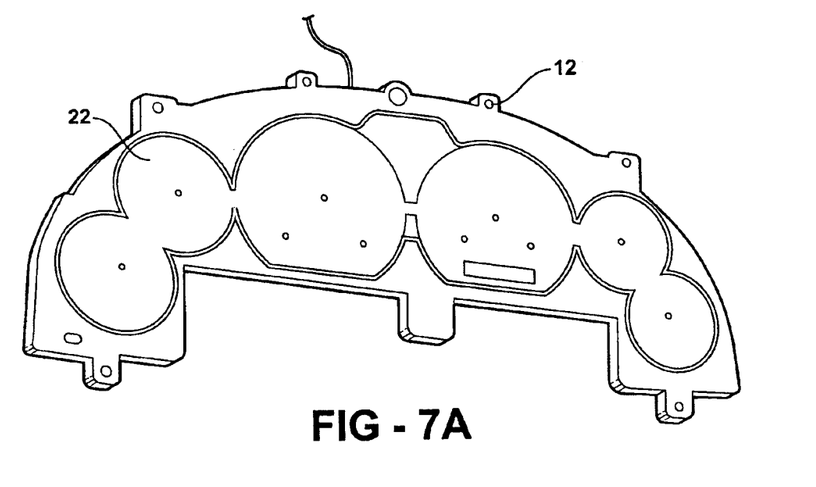
FIG. 7A is a front perspective view of a backlighting member attached to the support member of FIG. 4.
Figure 7B:
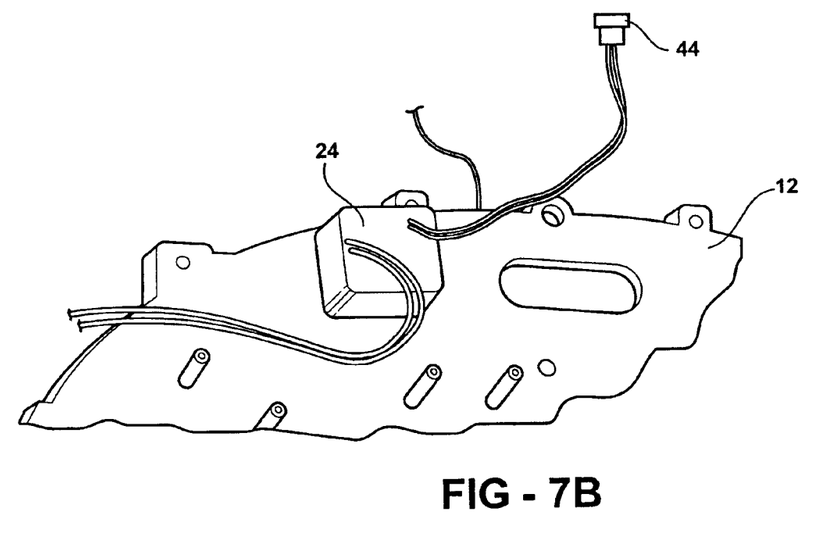
FIG. 7B is a fragmentary rear perspective view showing backlighting control circuitry attached to the support member.
Figure 8:
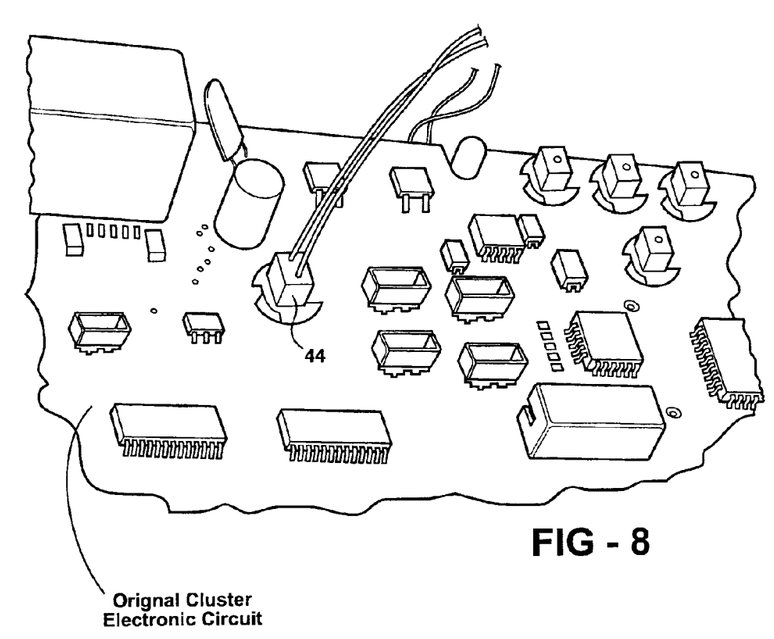
FIG. 8 is a fragmentary perspective view of an OEM cluster electronic circuit having the backlighting control circuitry connected to the OEM cluster circuit.

FIG. 7A shows a backlighting member 22, which is an electro-luminescent flat panel that is attached to the support member 12 with adhesive. The electro-luminescent panel can be easily designed to emit lighting with choices of several colors on specific areas of the backlighting member 22. The backlighting member 22 is connected to control circuitry 24 that is provided in the module. The control circuitry 24 comprises an adapter interface 44 created from an OEM lamp socket that interfaces to the original cluster circuitry lamp socket pad (see FIG. 8) where it picks up the control voltage for nighttime backlighting and dimming control. Furthermore, this design requires very little power consumption and very little space in the overall assembly.

Other alternatives for backlighting could be the use of a support member 12 that is transparent and can be edge lighted with LED, incandescent, or other lighting sources. Another method of backlighting is the use of a combination of light sources including the use of the existing original instrument cluster light sources. Furthermore, the custom instrument module could utilize the existing original instrument cluster light sources only, allowing for removal of the backlighting member 22.

The preferred embodiment for the graphic overlay 26 is the use of screen printing over a thin polycarbonate clear material. The graphic overlay 26 has multiple passes of colors and graphics to help create a unique appearance and instrument customization. The graphic overlay 26 contains the driver information that is required for the vehicle as well as additional information that may be desired.

The graphic overlay 26 is attached to the backlighting member 22 or directly to the support member 12 with use of adhesive or sonic welding. In some instances, the graphic overlay 26 and the backlighting member 22 may be combined into one part that comprises the graphics and the lighting. In still another instance, the graphic overlay 26 may be a formed graphic member with 3D characteristics.

The preferred embodiment for a custom bezel and lens assembly is an OEM molded bezel which is modified to accommodate an additional part or decoration 32. The OEM bezel is modified by use of a steel rule die, laser cutting, or routing. This modification allows an additional part such as a decoration 32 to be attached to the bezel by means of adhesion, such as ultra violet for fast curing, sonic welding, or fastening with screws. A lens is then attached to the custom bezel.

In some cases, the OEM bezel is simply an open face mask design. In this case, a custom design decorative plane such as carbon fiber, brushed aluminum, or metal could be utilized to cover the graphics much like a bezel style. A decorative part can then be fastened to the decorative plane or attached through the decorative plane and into the support member 12.

Figure 9A:
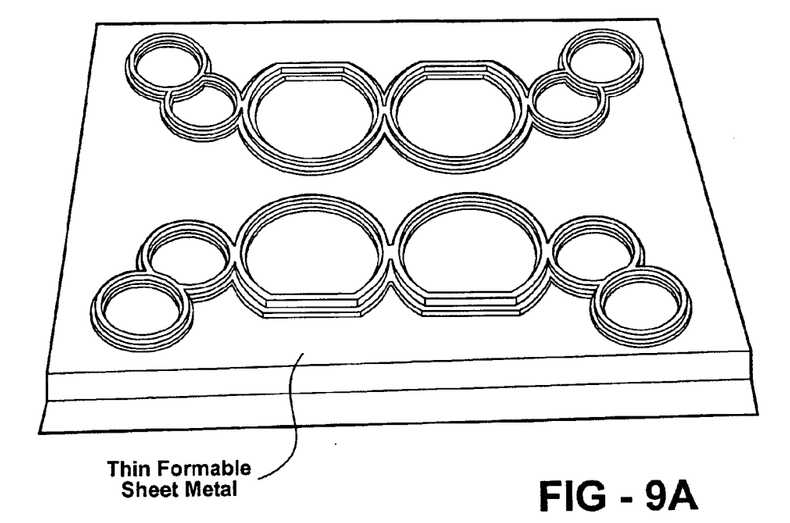
FIG. 9A is a front perspective view of a thermoformed sheet having thermoformed decorations formed thereon.
Figure 9B:
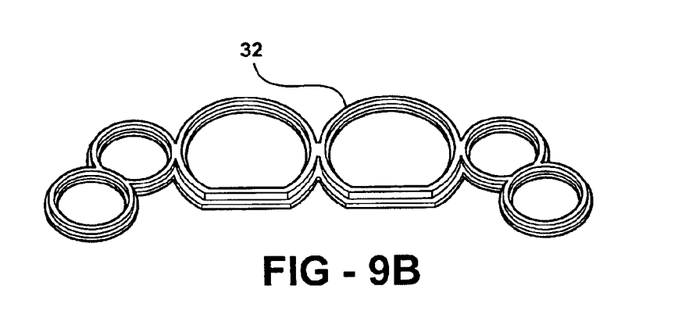
FIG. 9B is a perspective view of a decoration after cutting from the sheet.
Figure 9C:
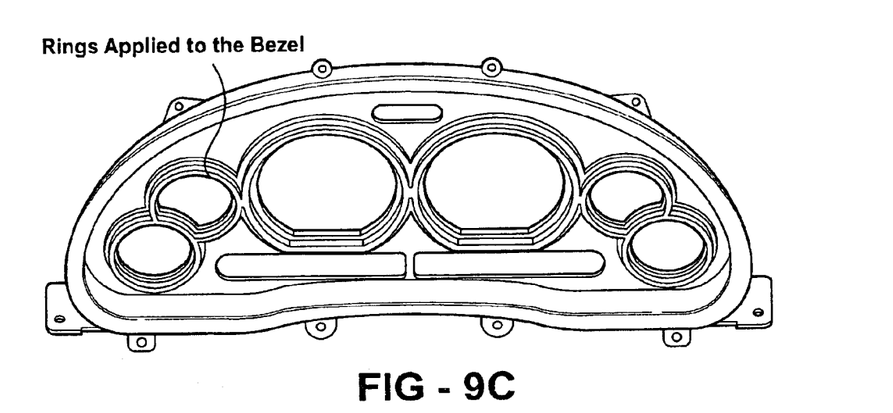
FIG. 9C is a perspective view of the decoration applied to a bezel.

FIG. 9 shows the decorative part 32 made from a thin, formable material shaped by a thermoforming process. For example, a decorative thin material such as Avery Dennison satin chrome finish on ABS formable material can be thermoformed into a decorative shape or trim. This shape is then die-cut to fit the modified bezel. The thin and lightweight decorative part is then attached to the bezel through a quick ultra violet adhesion process.

Alternatively, the decoration 32 can be created by use of an injection molding process which would allow for the creation of additional fasteners for assembly purposes.

Figure 10:
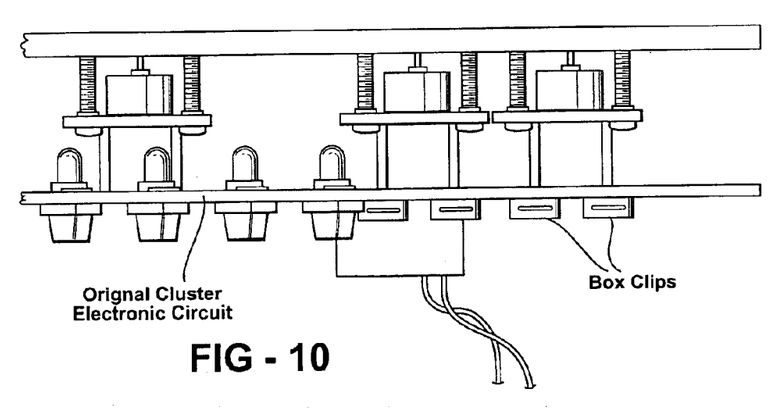
FIG. 10. is a fragmentary side view of an assembly showing an electrical interface between a custom instrument module of the present invention with an original cluster electronic circuit

FIG. 10 shows an operational assembly formed by assembly of the custom gauge module with the original instrument cluster circuitry and illustrating an electrical interface through the tin plated contact pins 20 extending from the custom instrument module to the original instrument cluster circuitry. These pins form an electrical path for the transfer of signals from the gauge box clips on the original cluster circuit to the gauge mechanisms 18 contained in the custom instrument module.

Figure 11B:
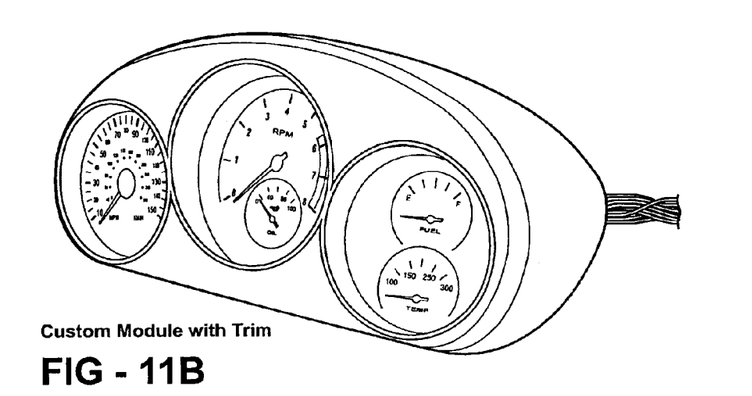
FIG. 11B is an edge view of the custom module and original cluster circuitry connected for mounting at separate locations.

FIG. 11B shows an alternative electrical interface utilizing a connection harness that is wired from a custom printed circuit 16 of a remote custom cluster module to the original instrument cluster circuitry. This allows the new cluster module to be installed into a different area than the original cluster circuitry.

Figure 12:
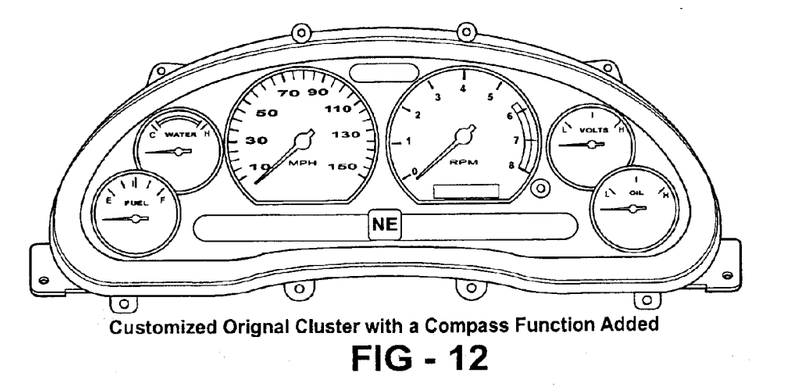
FIG. 12 is a front view of another embodiment in which the customized instrument cluster includes a device adding a function to those of the original instrument cluster.

FIG. 12 shows another embodiment wherein the custom cluster module includes an additional feature and function not present in the original instrument cluster. This function is provided by adding another instrument, such as a compass, to the custom cluster module itself.

Although the invention has been described by reference to these specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A calibrated custom vehicle gauge module assembly for use in customizing an OEM instrument cluster, said calibrated custom vehicle gauge module assembly comprising:

a support member;

a plurality of gauge motors attached on one side of said support member;

a custom graphic overlay on an opposite side of said support member;

means for electrically connecting said gauge module assembly to interface with an OEM instrument cluster circuit board of an OEM instrument cluster; and a pointer calibrated onto each of said gauge motors, whereby movement of said pointers on said gauge motors replicates OEM instrument cluster pointer movement.

2. The gauge module assembly of claim 1, wherein each of said gauge motors is attached to an individual printed circuit board, and said individual printed circuit boards are mounted on said support member.

3. The gauge module assembly of claim 1, further including a lighting member attached between said support member and said graphic overlay.

4. The gauge module assembly of claim 3, wherein said lighting member is electrically connected to an OEM lamp socket on the OEM instrument cluster circuit board by means of a lamp socket connection to provide power for the backlighting member.

5. The gauge module assembly of claim 1, further including a bezel adapted to fit over said graphic overlay.

6. The gauge module assembly of claim 5, further including a decoration mounted to said bezel.

7. The gauge module assembly of claim 5, further including a lens mounted to said bezel.

8. The gauge module assembly of claim 1, wherein said gauge motors are arranged in the same positions as in the OEM instrument cluster.

9. The gauge module assembly of claim 1, wherein at least one of said gauge motors is arranged in a position different than in the OEM instrument cluster.

10. The gauge module assembly of claim 1, wherein said gauge module assembly includes at least one gauge motor that performs a function that is not performed by the OEM instrument cluster.

11. The gauge module assembly of claim 1, wherein said gauge module assembly includes an additional display that displays information that is not displayed by the OEM instrument cluster.

12. The gauge module assembly of claim 1, wherein said means are pins.

13. The gauge module assembly of claim 1, wherein said means are electrical wires.

14. A calibrated custom vehicle gauge module assembly for use in customizing an OEM instrument cluster, said calibrated custom vehicle gauge module assembly comprising:
   a support member;
   a continuous custom printed circuit having multiple gauge motors, said continuous custom printed circuit being mountable on one side of said support member;
   a custom graphic overlay on an opposite side of said support member;
   means for electrically connecting said continuous custom printed circuit to electrically interface with an OEM instrument cluster circuit board; and
   a pointer calibrated onto each of said gauge motors, whereby movement of said pointers on said gauge motors replicates OEM instrument cluster pointer movement.

15. The gauge module assembly of claim 14, further including a lighting member attached between said support member and said graphic overlay.

16. The gauge module assembly of claim 15, wherein said lighting member is electrically connected to an OEM lamp socket on the OEM instrument cluster circuit board by means of a lamp socket connection to provide power for the backlighting member.

17. The gauge module assembly of claim 14, further including a bezel adapted to fit over said graphic overlay.

18. The gauge module assembly of claim 17, further including a decoration mounted to said bezel.

19. The gauge module assembly of claim 17, further including a lens mounted to said bezel.

20. The gauge module assembly of claim 14, wherein said gauge motors are arranged in the same positions as in the OEM instrument cluster.

21. The gauge module assembly of claim 14, wherein at least one of said gauge motors is arranged in a position different than in the OEM instrument cluster.

22. The gauge module assembly of claim 14, wherein said gauge module assembly includes at least one gauge motor that performs a function that is not performed by the OEM instrument cluster.

23. The gauge module assembly of claim 14, wherein said gauge module assembly includes an additional display that displays information that is not displayed by the OEM instrument cluster.

24. The gauge module assembly of claim 14, wherein the gauge module assembly is remotely connected to the OEM instrument cluster circuit board to allow mounting of the gauge module assembly at a location remote from the OEM instrument cluster circuit board.

25. The gauge module assembly of claim 14, wherein said means are electrical wires.

26. A method for forming a customized vehicle instrument cluster, said method comprising the step of:
   providing a calibrated custom vehicle gauge module assembly for use in customizing an OEM instrument cluster, said calibrated custom vehicle gauge module assembly including:
   a support member;
   a plurality of gauge motors attached on one side of said support member;
   a custom graphic overlay on an opposite side of said support member;
   means for electrically connecting said gauge module assembly to interface with an OEM instrument cluster circuit board of an OEM instrument cluster; and
   a pointer calibrated onto each of said gauge motors, whereby movement of said pointers on said gauge motors replicates OEM instrument cluster pointer movement.

27. The method of claim 26, wherein said means are pins.

28. The method of claim 26, wherein said means are electrical wires.

29. The method of claim 26, further including the steps of:
   obtaining an OEM instrument cluster assembly, said OEM instrument cluster including an OEM gauge sub-assembly and an OEM electronic circuitry;
   disconnecting an OEM gauge sub-assembly from an OEM electronic circuitry;
   removing the OEM gauge sub-assembly from the OEM instrument cluster assembly; and
   operatively connecting said calibrated custom vehicle gauge module assembly to said OEM electronic circuitry to form an operational customized instrument gauge cluster.

30. The method of claim 29, wherein the connecting step allows for the mounting of the calibrated custom instrument gauge module at a location remote from the OEM electronic circuitry.

31. The method of claim 29, wherein a customized bezel and lens is attached to the calibrated custom instrument gauge module.

32. The method of claim 29, wherein the obtaining step includes removing the OEM instrument cluster assembly from an existing vehicle; and
   the method further includes installing the customized instrument cluster assembly in an existing vehicle.

* * * * *